Jan. 13, 1970     B. PARKER     3,489,017

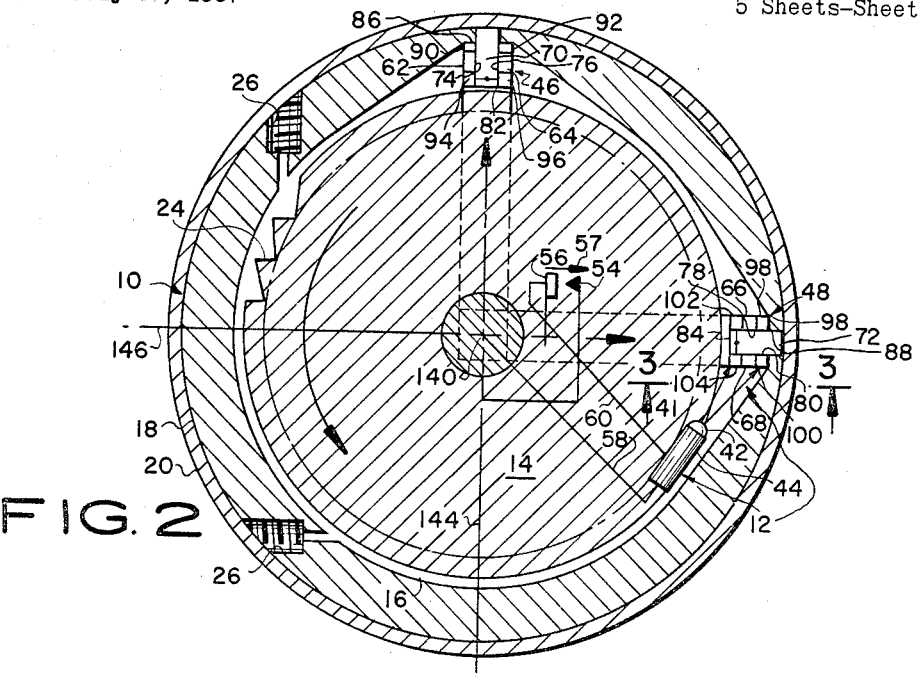
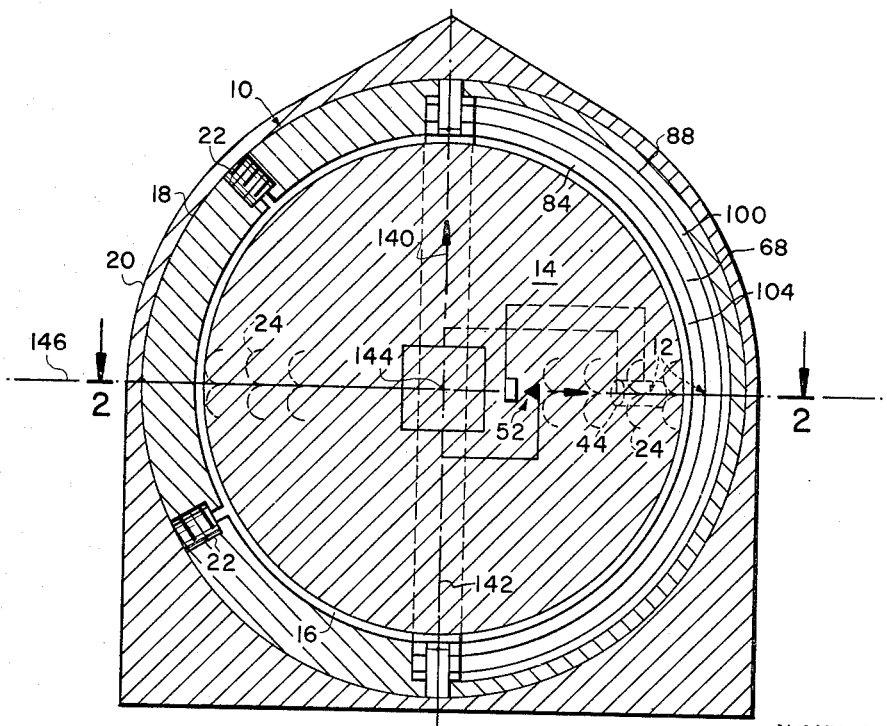
FIG. 2
FIG. 1
INVENTOR.
BERNARD PARKER

TWO-AXIS GIMBALLESS ALL-ATTITUDE GYRO

Filed July 19, 1967     5 Sheets-Sheet 2

INVENTOR.
BERNARD PARKER

BY

*Constantine A. Michalos*

ATTORNEY

Jan. 13, 1970   B. PARKER   3,489,017
TWO-AXIS GIMBALLESS ALL-ATTITUDE GYRO
Filed July 19, 1967   5 Sheets-Sheet 3

INVENTOR.
BERNARD PARKER
BY
Constantine A. Michalos
ATTORNEY

Jan. 13, 1970     B. PARKER     3,489,017

TWO-AXIS GIMBALLESS ALL-ATTITUDE GYRO

Filed July 19, 1967     5 Sheets-Sheet 4

INVENTOR.
BERNARD PARKER
BY
Constantine A. Michalos
ATTORNEY

INVENTOR.
BERNARD PARKER
BY
Constantine A. Michalos
ATTORNEY exit# United States Patent Office 3,489,017
Patented Jan. 13, 1970

3,489,017
TWO-AXIS GIMBALLESS ALL-ATTITUDE GYRO

Bernard Parker, Teaneck, N.J., assignor to Singer-General Precision, Inc., a corporation of Delaware
Filed July 19, 1967, Ser. No. 654,583
Int. Cl. G01c 19/28
U.S. Cl. 74—5.6                                              9 Claims

ABSTRACT OF THE DISCLOSURE

A two-axis gimballess all-attitude hydrostatic free rotor gyroscope with an opto-electronic pickoff system having a spherical rotor with a plurality of circumferentially located buckets for receiving rotational energy by jet gas streams directed tangentially through nozzles. The pickoff system has dual orthogonal photopots, each shaped like a flattened semi-doughnut having a rectangular cross section with opposed parallel sides substantially perpendicular to their axis and extending circumambient of one-half of the rotor and coated on both of said sides with a photosensitive material. On each side of each photopot, a high resistance electrode is spaced parallel to and radially inwardly from a related high conductivity electrode, the spacing therebetween being coated with a layer of the photosensitive material.

BACKGROUND OF THE INVENTION

Field of the invention

This invention relates generally to gyroscopes and more particularly to a gimballess hydrostatic gyroscope with an opto-electronic pickoff system for determining the attitude from zero degrees to 360 degrees about two axes, such as the pitch and the yaw axes of a missile.

Description of the prior art

Heretofore, it has been the practice to provide a rotor mounted on two gimbals, with their axes perpendicular to one another. A potentiometer, synchro or resolver, mounted along the axes would read out the angular position of the rotor. The necessity of having two gimbals supporting the rotor would adversely affect the performance of the gyroscope. Since the gimbals have mass, they induce gyro errors in an acceleration field. Additionally, the gimbals are subjected to gimbal lock, should the vehicle go through a 90 degree motion about the yaw axis and then move about the pitch axis. Gimbals also cause gyro errors when a combination of rotational inputs, about more than one axis, is applied to the gyro. Conventional gimballing often causes drifts due to anisoelastic behavior. All these effects must be trimmed out, leading to an expensive gyro component. In addition, the use of pickoffs mounted on the axes of the gimbals, for determining the angular position of the rotor, produce errors in the read out because of the mass unbalance of the gimbals and gimbal misalignment.

SUMMARY OF THE INVENTION

Therefore, it is an object of this invention to provide an all-attitude hydrostatic free rotor gyro which has no gimbals and is capable of accurately measuring the attitude from zero degrees to 360 degrees about two axes, such as the pitch axis and the yaw axis, of a vehicle by means of an opto-electronic pickoff.

Another object of this invention is to provide a simplified hydrostatically supported spherical rotor, including a housing, wherein there is means of determining location of the rotor in relation to the housing by means of an optical electronic system.

Another object of this invention is to provide a gyroscope whereby a reversal of the direction of the vehicle supporting the gyroscope can be determined by means of an optical photosensing system.

Another object of this invention is to provide a gyroscope eliminating gimbals which were previously necessary for 360 degree readout information.

Still another object of this invention is to provide a readout means that is simple and direct and wherein no gimbals are used and wherein the readout is not dependent on the rotor speed.

An additional object of this invention is to provide a simplified gyro for eliminating such errors as mass unbalance of the gimbals and gimbal misalignment errors.

Other objects and many additional advantages will be more readily understood by those skilled in the art after detailed consideration of the following specification taken with the accompanying drawing.

BRIEF DESCRIPTION OF THE DRAWING

FIGURE 1 is a schematic view, partially in section, of the all-attitude free rotor gyroscope in accordance with a preferred embodiment of the invention;

FIGURE 2 is a sectional view, taken along line 2—2 of FIGURE 1, illustrating the cooperative relationship of the pickoff readout means, with light and optic means supported on the rotor of the gyroscope and two photopots supported on the housing of the gyroscope;

Figure 4:
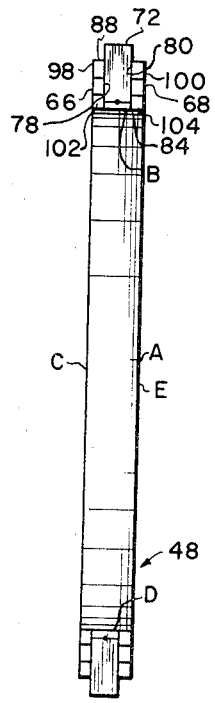
FIGURE 4 is an end view taken along line 4—4 of FIGURE 3.

This invention provides for a two-axis gimballess all-attitude hydrostatic free rotor gyro system utilizing an opto-electronic pickoff of optimum simplicity and reliability.

Referring to FIGURES 1 through 8 of the drawing, there is illustrated a novel two-axis hydrostatic gas bearing gimballess all-attitude gyroscope 10 having an opto-electronic pickoff 12 supported on a rotor 14. The rotor 14 is supported on hydrostatic gas bearing pads 16 enclosed in a housing 18 which in turn is supported within an illustrative missile, 20. The rotor 14 is completely spherical and is enclosed in a spherical shell of the housing 18. The hydrostatic gas bearing 16 is supplied by pressure gas through eight gas bearing inlets 22, two of which are shown in FIGURE 1.

Figure 7:
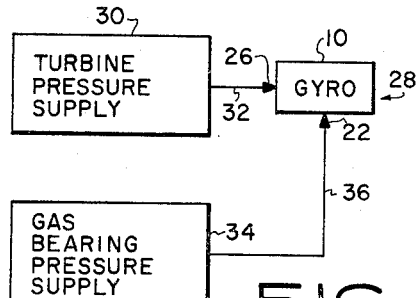
FIGURE 7 is a block diagram of the turbine and gas bearing pressure supply system utilized in the invention.

Turbine buckets 24 are cut into the rotor 14 providing a means for driving the rotor 14 through gas nozzles 26 directing propulsion gas onto the buckets 24, as shown in FIGURE 2. A tubrine and gas supply system 30 and 34, for the propulsion and for the hydrostatic pads, is shown in FIGURE 7, in which a turbine pressure supply 30, which can be a one shot operational unit, such as bottled gas, directs gas through a hydraulic conduit 32, to the nozzles 26 to drive the rotor 14 by the gas directed through the nozzles 26 onto the buckets 24. In addition, there is provided a gas bearing pressure supply 34, which directs pressure gas through hydraulic conduit 36 to the bearing inlets 22 for internally supplying the hydrostatic gas bearing 16 with gas pressure to support the rotor 14 for rotation by the gas directed through the nozzles 26.

It should be noted, therefore, and as hereinbefore described, the gas supply from the source 30 flows through the conduit 32, through the nozzles 26, to impinge upon the rotor buckets 24, driving the rotor 14 to a predetermined final speed, whereupon the gas supply may be cut off or exhausted as in the case of a single shot bottle of gas. The gas shut-off also uncages the rotor 14 with uncaging arrangement, not shown, when the rotor 14 reaches the predetermined speed. Now since the rotor 14 is uncaged, and since it is supported by the hydrostatic gas bearing 16, which in turn is continuously supplied by gas through the inlets 22 throughout the life of the mission of the missile, it will be noted that the rotor 14 is free to take the attitude depending on the turning of the missile 20.

Figure 8:
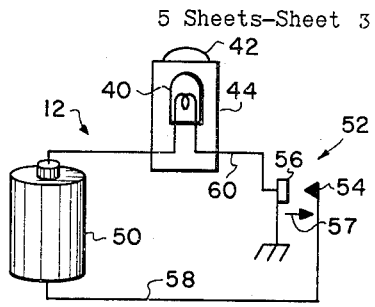
FIGURE 8 is a layout of the electric circuitry of the element of the invention shown in FIGURES 1 and 2.

As shown in FIGURES 1 to 4 and 8, the opto-electronic pickoff 12 comprises a single light source 40 directing a light beam 41 through an optic means 42 supported within a casing 44, for rotation on the rotor 14, and two photopots, a pitch photopot 46 and a yaw photopot 48, which are like flattened semi-doughnuts and orthogonally supported on the housing 18. As shown in FIGURE 8, the opto-electronic pickoff 12 also includes an electric source such as a battery 50 and a centrifugal switch 52 which are contained within the rotor 14. The switch 52 includes a stationary contact 54 and a movable contact 56. The movable contact 56, shown in FIGURES 1, 2, and 8 is spaced from the stationary contact 54 when the rotor 14 is in a substantially stationary position. The movable contact 56 is moved radially outwardly from the center location of the rotor 14 as shown by arrow 57 when the rotor 14 achieves the predetermined final speed. The centrifugal force then causes the movable contact 56 to connect with the stationary contact 54 and thereby closing the switch 52. Current then flows from the battery 50 through conduit 58 through the connected contacts 54 and 56 of the switch 52, through conduit 60 to supply energy to the light source 40. The light which is emitted from the light source 40 is then directed through the optic means 42 in a tangential direction for impinging a beam 41 on each of the fixed photopots 46 and 48 once per revolution. The section of the photopots that the beam 41 from the light source 42 strikes determines the attitude angle of the rotor 14 and in turn determines the attitude of the missile 20.

As shown in FIGURES 1 to 4, each photopot, 46 and 48, is coated on both sides with photosensitive material 62, 64 and 66, 68 on substrate 70 and 72, respectively. The photosensitive material may be cadmium sulfide, cadmium selenide, lead sulfide, gallium arsenide. The photopots 46 and 48 are at right angles to each other and semi-encircling rotor 14, within the housing 18, as best shown in FIGURES 1 and 2. Each photopot 46 and 48 is in the shape of the flat semi-doughnut and substantially rectangular in cross section having surfaces 74, 76, 78, 80 which support the photosensitive material 62, 64 and 66, 68, respectively. The surfaces 74, 76 and 78, 80 are substantially perpendicular to inner diametrical surfaces 82, 84 and outer diametrical surfaces 86, 88 of photopots 46 and 48, respectively.

The surfaces 74, 76 of the pitch photopot 46 are supporting high conductivity electrodes 90 and 92, photosensitive material 62 and 64, and high resistance electrodes 94 and 96. Further the surfaces 78, 80 of the yaw photopot 48 are supporting high conductivity electrodes 98 and 100, photosensitive material 66 and 68 and high resistance electrodes 102 and 104. Therefore, as best shown in FIGURE 2, the pitch photopot 46 includes on the one surface 74, the high conductivity electrode 90 and the high resistance electrode 94 with the photosensitive material 62 interposed therebetween and on the other surface 76 it includes the high conductivity electrode 92, and the high resistance electrode 96 with the photosensitive material 64 interposed therebetween. As best shown in FIGURES 1 to 4, the yaw photopot 48 includes on the one surface 78 the high conductivity electrode 98 and the high resistance electrode 102 with the photosensitive material 66 interposed therebetween and on the other surface 80 it includes the high conductivity electrode 100 and the high resistance electrode 104 with the photosensitive material 68 interposed therebetween.

Figure 3:
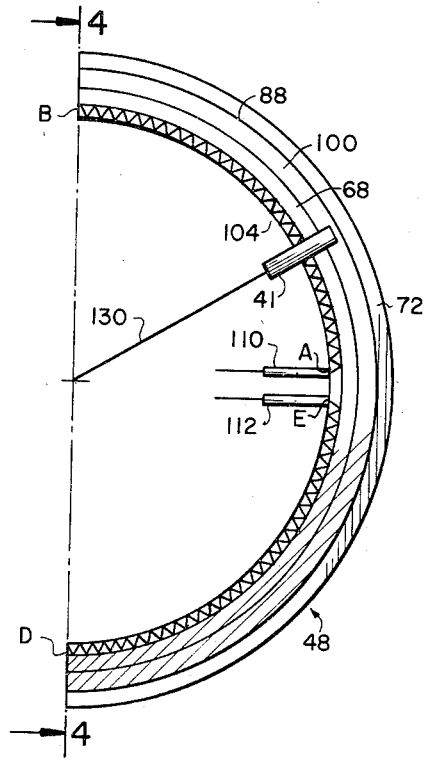
FIGURE 3 is a detailed view of one of the photopot elements shown in FIGURES 1 and 2, taken along line 3—3 of FIGURE 2.
Figure 5:
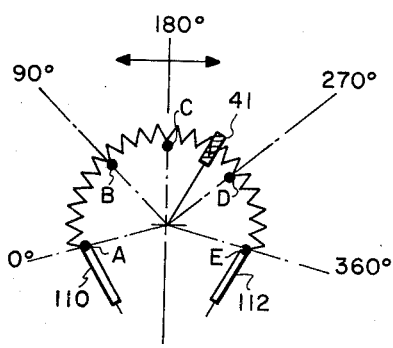
FIGURE 5 is a schematic of one photopot electrical element shown in FIGURES 3 and 4.

As best shown in FIGURES 3, 4, and 5, the high resistance electrodes 102 and 104 of the yaw photopot 48 may be of a continuous single rheostat type element extending from point A on surface 80 to the top of the photopot 48, as viewed in FIGURE 3, to point B, over to the other side of the photopot on surface 78 to the center point C, down to the bottom of the photopot 48 to point D and back on the first side on surface 80 to point E which is on the center of the photopot 48, as viewed in FIGURE 3.

Figure 10A:
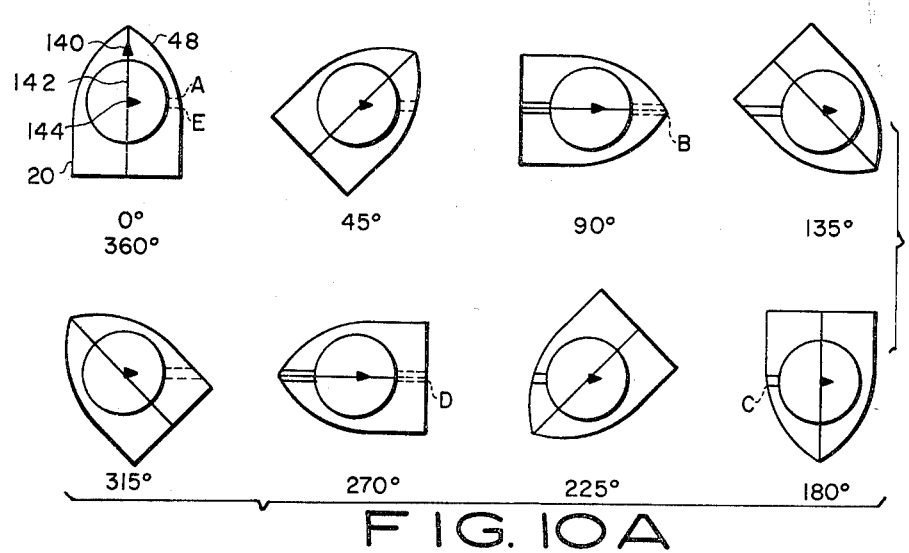
FIGURE 10A is a diagrammatical representation of attitude change of the vehicle as described in an example in the specification of the operational procedure of the system.

Therefore, as best shown in FIGURE 10a and in the circuitry of FIGURE 5, the yaw photopot 48 is the continuous rheostat starting from a terminal 110 at point A, to point B which is when the missile will veer 90 degrees about the yaw axis, to point C when the missile veers 180 degrees, to point D when the missile veers 270 degrees and back to point E to terminal 112, when the missile veers 360 degrees about the yaw axis.

Figure 6:
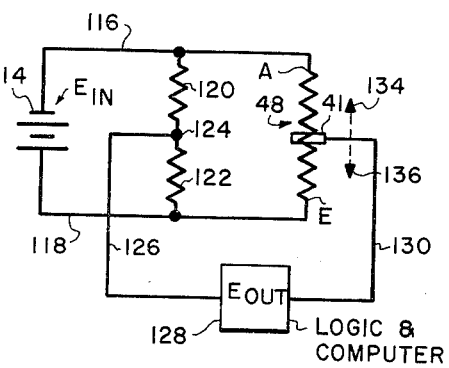
FIGURE 6 is another schematic of the photopot electrical element shown in FIGURES 3 and 4.

FIGURE 6 shows the yaw photopot 48 in an electrical schematic with power input 114 connected by electric conduit 116 to point A of the photopot 48 and by conduit 118 to point E. Interposed in series, between conduits 116 and 118, are resistors 120 and 122. Midway between resistors 120 and 122, at junction 124, is another conduit 126 connecting a logic and computer means 128. A conduit 130 symbolically connects the beam of light 41 which impinges across the high conductivity electrodes 98, 100 and the high resistance electrodes 102 and 104. The beam of light moves, as shown by arrows 134 and 136, as the missile 20 veers about its yaw axis.

In the operation of this invention, referring to FIGURES 9 to 14 of the drawing, for example, if the gyro 10 was installed in the missile 20, as shown in FIGURES 1 and 2, such that the housing 18 was fixed to the frame of the missile 20 and a spin axis 140 of the gyro 14, as shown in FIGURE 1, is along the missile's longitudinal axis 142, then axis 144, shown in FIGURE 2, would define the yaw axis while axis 146 would define the pitch axis.

In the start of the missile's flight, the gas supplied from the source 30, shown in FIGURES 2 and 7, flows through the nozzle 26 and impinges on the rotor buckets 24 driving the rotor 10 to its predetermined final speed whereupon the gas supply can be cut off. The gas shut off also uncages the rotor with an uncaging arrangement while the rotor 14 is supported on the hydrostatic gas bearing 16, which is continuously supplied with gas from the gas bearing pressure supply 34, shown in FIGURE 7, throughout the life of the mission.

When the rotor 14 has achieved the predetermined final speed, the switch 52, contained within the rotor 14 is actuated by the centrifugal force supplying energy to the light source 40. The light which is emitted from the light source 40 is directed tangentially from the rotor 14 and impinges as the beam 41 on each of the fixed photopots 46 and 48 once per revolution. The section of the photopots that the light source strikes determines the attitude angle of the rotor 14 and in turn the attitude of the missile 20.

Figure 9:
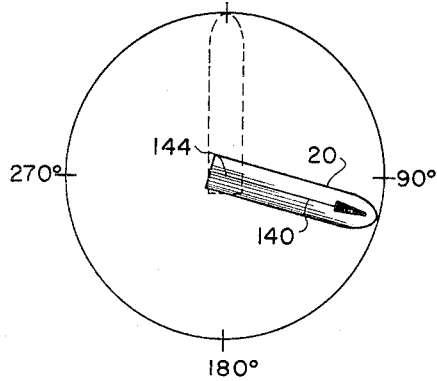
FIGURE 9 is a schematic of the attitude of the vehicle as described in an example in the specification of the operational procedure of the system.

For example, if the gyro were installed in the missile 20 such that the gyro was fixed to the missile's frame as stated before, and the spin axis 140 where along the missile's longitudinal axis 142 then when the missile 20 veers about the yaw axis 144 as shown in FIGURES 9 and 10 from 0 degrees to 45 degrees and then through 90 degrees, the light beam 41 will be striking the bottom side of the yaw photopot 48, as viewed in FIGURE 2, from 0 degrees to 90 degrees the top side from 90 degrees to 270 degrees and back to the bottom side from 270 degrees to 360 degrees. At the cross over points of the yaw axis, the logic circuitry 128 will switch the pitch photopot 48 thereby reversing the 0 degree and 180 degrees point, thus preserving the pitch photopot information.

Following is a table showing the logic as it will occur as the missile is in flight and its longitudinal axis 142 veers from the gyro spin axis 140. Both the photopots 46 and 48 would transmit the difference about both the pitch and yaw axes.

SWITCHING LOGIC

Figure 11:
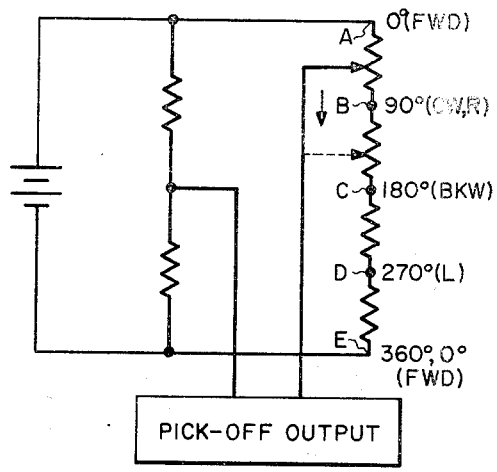
FIGURE 11 is an electrical schematic circuitry illustrating one attitude position of the vehicle.
Figure 12:
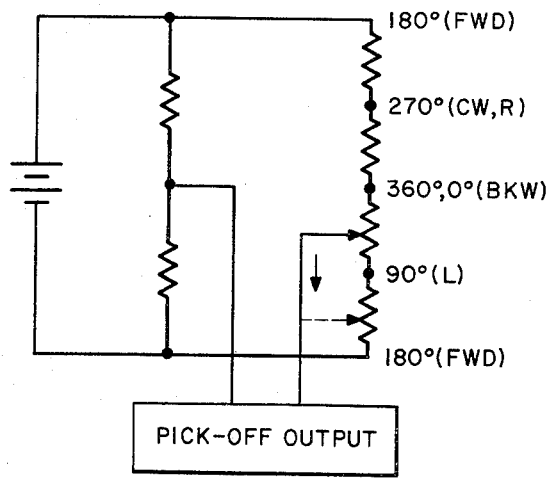
FIGURE 12 is an electrical schematic circuitry illustrating another attitude position of the vehicle.
Figure 13:
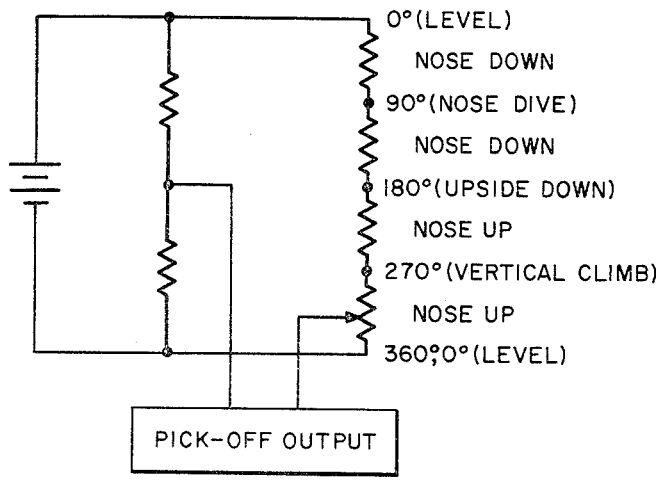
FIGURE 13 is still another electrical schematic circuitry illustrating still another attitude position of the vehicle; and, FIGURE 14 is still another electrical schematic circuitry illustrating still another attitude position of the vehicle.
Figure 14:
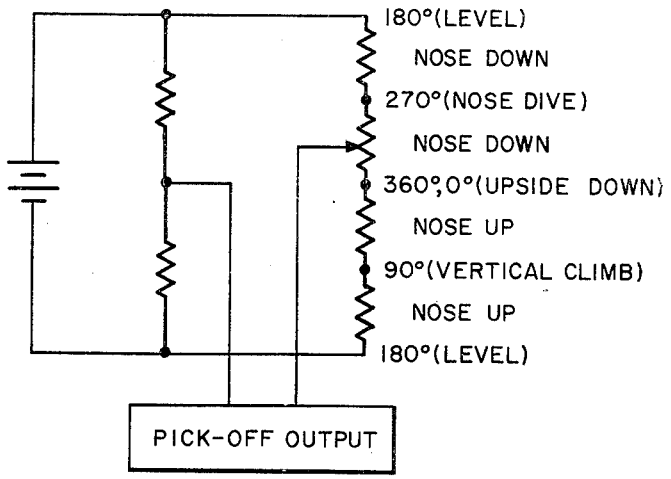

| Rotation about— | | Logic switches | |
| --- | --- | --- | --- |
| Yaw axis | Pitch axis | Yaw ckt | Pitch ckt |
| 0°→90° | 0° | Fig. 11 | Fig. 13. |
| 90°→180° | 0° | Fig. 11 | Fig. 14. |
| 180°→270° | 0° | Fig. 11 | Fig. 14. |
| 270°→360° | 0° | Fig. 11 | Fig. 13. |
| 0° | 0°→90° | Fig. 11 | Fig. 13. |
| 0° | 90°→180° | Fig. 12 | Fig. 13. |
| 0° | 180°→270° | Fig. 12 | Fig. 13. |
| 0° | 270°→360° | Fig. 11 | Fig. 13. |

| Generally therefore, when— | | Then use the following circuits— | |
| --- | --- | --- | --- |
| Yaw angle is— | Pitch angle is— | Yaw ckt | Pitch ckt |
| 90°→180°→270° | 270°→(360°,0°)→90° | Fig. 11 | Fig. 14. |
| 270°→(360°,0°)→90° | 270°→(360°,0°)→90° | Fig. 11 | Fig. 13. |
| 270°→(360°,0°)→90° | 90°→180°→270° | Fig. 12 | Fig. 13. |
| 90°→180°→270° | 90°→180°→270°→ | Fig. 12 | Fig. 14. |

Figure 10B:
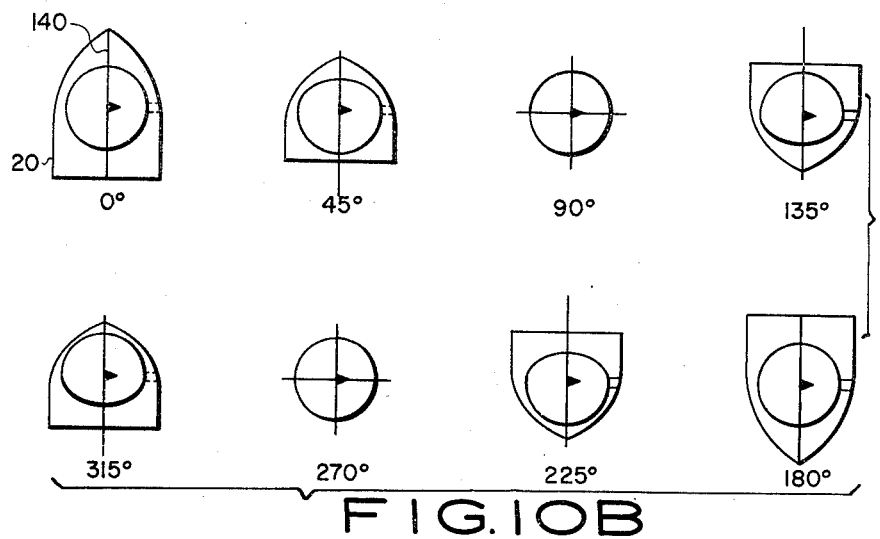
FIGURE 10B is a diagrammatical representation of another attitude change of the vehicle as described in an example in the specification of the operational procedure of the system, as in FIGURE 10A.

Schematically as shown in FIGURE 10a and FIGURE 10b, the missile veers in a combination of ways which would be computed in the logic and computer 128 as outlined in the schematic electrical circuitry of FIGURES 11, 12, 13, and 14.

For example, referring again to FIGURES 5, 10a, and 11, as the beam of light 41 travels along the photopot 48 at 0 degrees or point A, the missile 20 would be going in a forward direction, at point B, or at 90 degrees, the missile would have been rotated counterclockwise to the right. At point C or at 180 degrees, the missile would start going backwards. At point D, or at 270 degrees, the missile would be going towards the left, as viewed in FIGURE 10. At point E, the missile would be going forward again or at 360 degrees from its original rotation. The same occurrence would be presented as outlined in FIGURES 12, 13, and 14 in different attitudes of the missile 20.

As brought out before, the advantages over the previous methods are primarily in that the gyro of this invention eliminates the need for gimbals previously necessary for the 360 degree readout information. The readouts are simple, direct reading without the need of gimbals. The readout is not dependent on the rotor speed, and the simplicity of the gyro eliminates such errors as mass unbalance of gimbals and gimbal misalignment errors. Overall, the system is capable of measuring the position of a spinning rotor about two orthogonal axes through 360 degrees rotation about either axis or combination of axes without the use of gimbals.

While the present invention has been described in a preferred embodiment, it will be obvious to those skilled in the art that various modifications can be made therein within the scope of the invention, and it is intended that the appended claims cover all such modifications.

What is claimed is:

1. In a two-axis gimballess all-attitude hydrostatic free rotor gyroscope with an opto-electronic pickoff system having a rotor, a housing supporting said rotor, bearings interposed between said rotor and said housing for supporting said rotor by said housing, said opto-electronic pickoff means having first means supported on said housing, and second means supported on said rotor for interacting with said first means whereby there is optic-sensing interplay between said two means for sensing the location of said rotor relative to said housing about the two axes of said gyroscope, said device being capable of operation about each axis through 360 degrees, the improvement therein, wherein said opto-electronic pickoff means comprises a single light source, optic means receiving said light from said light source and directing it tangentially from said rotor, a pair of orthogonally supported photopots shaped like flattened semi-doughnuts located on said housing, each of said photopots including conducting means of high and low conductivity on the flattened surfaces of said photopot and photosensitive material interposed therebetween for receiving the light beam and connecting said high conductor to said low conductor at a location depending on the attitude of the housing relative to said rotor.

2. The structure of claim 1 wherein said rotor is spherical and said housing includes a spherical shell for supporting said spherical rotor through said bearing and further wherein said bearings are of hydrostatic gas-bearing type having gas pressure between said spherical rotor and the spherical shell of said housing for supporting said rotor within said housing on gas bearing pads.

3. The structure of claim 1 wherein said rotor is spherical and said housing having a spherical shell, and wherein said bearings comprised of gas bearing pads, and means for directing gas within said pads for providing supporting pressure interposed between said spherical rotor and the spherical shell of said housing and thereby supporting said rotor within said housing throughout 360 degrees operable positions.

4. The structure of claim 3 wherein said pressure supply means includes a plurality of gas bearing inlets extending equal distance throughout the spherical shell of said housing and supply means directing pressure through said inlets radially inwardly between a spacing of said rotor and said housing and thereby supporting said rotor equal distance within the housing of said gyroscope for its operation.

5. The structure of claim 1 wherein said rotor is spherical and said housing includes a spherical shell spaced from said spherical rotor and supporting said rotor within said shell, and a missile supporting said housing wherein said bearings include hydrostatic gas bearing pads, gas bearing pressure supply directing pressure gas to said hydrostatic pads for centrally supporting said rotor within the shell of said housing and hydrostatic means for rotating said rotor relative to said housing and said missile.

6. The structure of claim 5 wherein said hydrostatic rotating means includes rotor buckets on the periphery of said rotor, gas supply means directing gas tangentially from said housing to said rotor for rotating said rotor relative to said housing and wherein said pickoff means senses the movement of said housing relative to the rotation of said rotor and determining the attitude of said housing depending on the movement of said housing relative to said rotor and in turn determining the attitude of the missile.

7. In a two-axis gimballess all-attitude hydrostatic free rotor gyroscope with an opto-electronic pickoff system having a rotor, a housing supporting said rotor, bearings interposed between said rotor and said housing for supporting said rotor by said housing, said opto-electronic pickoff means having first means supported on said housing, and second means supported on said rotor for interacting with said first means whereby there is optic-sensing interplay between said two means for sensing the location of said rotor relative to said housing about the two axes of said gyroscope, said device being capable of operation about each axis through 360 degrees, the improvement therein, wherein said opto-electronic pickoff system includes a light source directing a beam of light tangentially from said rotor and to said housing, said housing having a spherical shell wherein said rotor is rotated on said bearings, a centrifugal switch contained in said rotor and a light source connecting said centrifugal switch wherein said switch includes a movable contact and a stationary contact, operably open when said rotor is in a stationary position and which said movable contact moves radially outwardly to contact the stationary contact for closing said switch upon a centrifugal force caused by the rotation of said rotor at a predetermined speed and said pickoff means further including a pair of photopots at right angles to each other having a rectangular cross section with two opposed side surfaces and circumscribing one half of the spherical shell of said housing for receiving the light beam from said light source tangentially of said rotor on said side surfaces whereupon when said housing is moved relative to said rotor the light beam strikes a different location on said photopots thereby sensing the location of said housing relative to said rotor.

8. The structure of claim 7 wherein said photopots include a substrate, a coating of photosensitive material on both side surfaces of said substrate, a high conductivity electrode on the outer flat portion of each of the sides of each photopot and a high resistance electrode on the inner flat portion of each of the sides of each photopot having the central portion between said outer and said portions supporting said photosensitive material whereby when the light hits said photosensitive material it causes conductivity between the high resistance electrode and the high conductivity electrode, and means for receiving the electrical signal which is caused by the conduction of said photosensitive material and thereby determining the location of said housing relative to said rotor.

9. In a two-axis gimballess all-attitude hydrostatic free rotor gyroscope with an opto-electronic pickoff system having a rotor, a housing supporting said rotor, bearings interposed between said rotor and said housing for supporting said rotor by said housing, said opto-electronic pickoff means having first means supported on said housing, and second means supported on said rotor for interacting with said first means whereby there is optic-sensing interplay between said two means for sensing the location of said rotor relative to said housing about the two axes of said gyroscope, said device being capable of operation about each axis through 360 degrees, the improvement therein comprising a missile whose attitude is to be determined securing said housing and wherein said rotor is spherical and said housing includes a spherical shell encompassing said rotor, bucket means supported on the periphery of said rotor, turbine nozzles directing a gas supply to said buckets for rotation of said rotor, gas supply means for directing gas to said turbine nozzles, said bearings including hydrostatic bearing pads interposed between said rotor and said housing, bearing inlet means directing pressure gas to said hydrostatic bearings for supporting said rotor centrally within said housing, pressure supply means directing gas pressure to said bearing inlet, wherein said opto-electronic pickoff means or sensing the location of said rotor relative to said housing includes a pair of semi-doughnut rectangular cross sectioned orthogonally supported photopots supported by said housing, one photopot operably determining the pitch and the other photopot determining the yaw of said missile and the opto-electronic pickoff means including an electric source such as a battery and a centrifugal switch which is contained within the rotor, said centrifugal switch operably closing upon rotation of said rotor at a predetermined speed and directing a light beam to said photopot, and wherein said photopots include a high conductivity electrode supported on its outer rim and a high resistance electrode supported on its inner rim with photosensitive materials interposed therebetween whereby when the light hits such photosensitive material it will energize it and would bridge the high conductivity electrode with its related high resistance electrode at each revolution of said rotor and thereby short-circuiting the high conductivity electrode with the high conductivity electrode on each of said revolution whereby the attitude of said housing will be determined depending on the location the light beam impinges upon each photopot.

References Cited

UNITED STATES PATENTS

| 3,276,270 | 10/1966 | Speen | 74—5.6 |
| 3,277,304 | 10/1966 | Vyce | 74—5.6 XR |
| 3,301,071 | 1/1967 | Shalloway | 74—5.6 |
| 3,328,595 | 6/1967 | Todd | 74—5.6 XR |
| 3,355,953 | 12/1967 | Johnson | 74—5 |

FRED C. MATTERN, Jr., Primary Examiner

MANUEL ANTONAKAS, Assistant Examiner

U.S. Cl. X.R.

53—1, 162; 198—137; 214—6

PO-1050
(5/69)

UNITED STATES PATENT OFFICE
CERTIFICATE OF CORRECTION

Patent No. 3,489,017  Dated January 13, 1970

Inventor(s) Bernard Parker

It is certified that error appears in the above-identified patent and that said Letters Patent are hereby corrected as shown below:

Column 3, line 7, change the word "turbrine" to read --turbine--.

Column 3, line 63, change the figure "42" to read --40--.

Column 5, line 18, after the word "degrees", second occurrence, insert a comma --,--.

Column 8, line 17, change the word "or" to read --for--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents